(12) United States Patent
Chaskar et al.

(10) Patent No.: US 7,480,307 B2
(45) Date of Patent: Jan. 20, 2009

(54) PROTOCOL TO DETERMINE OPTIMAL TARGET ACCESS ROUTERS FOR SEAMLESS IP-LEVEL HANDOVER

(75) Inventors: Hemant M. Chaskar, Woburn, MA (US); Dirk Trossen, Arlington, MA (US); Govind Krishnamurthi, Arlington, MA (US)

(73) Assignee: Nokia, Inc., Irving, TX (US)

( * ) Notice: Subject to any disclaimer, the term of this patent is extended or adjusted under 35 U.S.C. 154(b) by 684 days.

(21) Appl. No.: 11/018,676

(22) Filed: Dec. 22, 2004

(65) Prior Publication Data

US 2005/0100030 A1    May 12, 2005

Related U.S. Application Data

(62) Division of application No. 09/892,611, filed on Jun. 28, 2001, now Pat. No. 7,313,628.

(51) Int. Cl.
*H04L 12/56* (2006.01)
*H04L 12/16* (2006.01)
*H04Q 7/00* (2006.01)
*H04Q 7/20* (2006.01)

(52) U.S. Cl. .................. 370/401; 370/255; 370/328; 455/436; 455/437; 455/443

(58) Field of Classification Search ............... 370/255, 370/315, 395.52; 455/436, 438, 439, 443
See application file for complete search history.

(56) References Cited

U.S. PATENT DOCUMENTS 5,822,313 A    10/1998    Malek et al. ................. 370/332

(Continued)

FOREIGN PATENT DOCUMENTS

CA    2287786 A1    6/2000

(Continued)

OTHER PUBLICATIONS

Padmanabhan, et al., Article titled: Determining the Geographic Location of Internet Hosts, Microsoft Research, 2 pages, Jun. 2001.

(Continued)

*Primary Examiner*—Edan Orgad
*Assistant Examiner*—Blanche Wong
(74) *Attorney, Agent, or Firm*—Banner & Witcoff, Ltd.

(57) ABSTRACT

An apparatus and method is provided for facilitating the seamless handoff of IP connections between access routers in an IP network. The mobile IP network includes two or more access routers each serving a different geographic service area. When a mobile terminal moves from the first service area to the second service area, the mobile terminal transmits to the second access router the IP address of the previous access router. The second access router uses this information to learn capabilities of the first access router (e.g., bandwidths supported, security schemes, and the like) for use in future handoff decisions, and exchanges capability information with the first access router. The assumption is made based on the exchanged information that the access routers are geographically proximate. When another mobile terminal transitions from one service area to another, the system selects an optimal target access router based on the previously learned information, including the inferred geographic proximity between access routers.

15 Claims, 7 Drawing Sheets

U.S. PATENT DOCUMENTS

| | | | | |
|---|---|---|---|---|
| 6,088,587 | A | 7/2000 | Abbadessa | 455/424 |
| 6,160,804 | A | 12/2000 | Ahmed et al. | 370/349 |
| 6,360,264 | B1 * | 3/2002 | Rom | 709/227 |
| 6,421,714 | B1 | 7/2002 | Rai et al. | |
| 6,434,134 | B1 * | 8/2002 | La Porta et al. | 370/338 |
| 6,654,359 | B1 | 11/2003 | La Porta et al. | |
| 6,763,007 | B1 | 7/2004 | La Porta et al. | |
| 6,798,773 | B2 * | 9/2004 | Trossen et al. | 370/390 |
| 6,928,282 | B2 | 8/2005 | Taniguchi | |
| 7,224,677 | B2 * | 5/2007 | Krishnamurthi et al. | 370/331 |
| 7,313,628 | B2 * | 12/2007 | Chaskar et al. | 709/238 |
| 2002/0031107 | A1 * | 3/2002 | Li et al. | 370/338 |
| 2002/0105926 | A1 * | 8/2002 | Famolari et al. | 370/331 |
| 2002/0131386 | A1 * | 9/2002 | Gwon | 370/338 |
| 2002/0141360 | A1 * | 10/2002 | Baba et al. | 370/331 |
| 2002/0168980 | A1 * | 11/2002 | Gwon et al. | 455/437 |
| 2003/0092444 | A1 * | 5/2003 | Sengodan et al. | 455/436 |
| 2003/0142651 | A1 | 7/2003 | Matta et al. | |
| 2003/0227911 | A1 * | 12/2003 | Trossen | 370/352 |
| 2004/0165551 | A1 | 8/2004 | Krishnamurthi et al. | |

FOREIGN PATENT DOCUMENTS

| | | | |
|---|---|---|---|
| EP | 0589552 | A2 | 3/1994 |
| JP | 2004229276 | A | 8/2004 |

OTHER PUBLICATIONS

Bahl, et al., Article titled: "Radar: An In-Building RF-based User Location and Tracking System", Microsoft Research, 10 pages, Mar. 2000.

Perkins, Paper titled: "IP Mobility Support", Network Working Group, Oct. 1996, pp. 1-17.

Enge, et al., Article titled: "Scanning the Issue/Technology", Proceedings of the IEEE, vol. 87, No. 1, Jan. 1999, pp. 3-15.

Castelluccia, et al.: Paper titled: "Toward a Unified Hierarchical Mobility Management Framework", Internet Engineering Task Force, Jun. 25, 1999, pp. 1-15.

Lindqvist, Paper titled: "Micro Mobility Solutions for IP", May 26, 2000, pp. 1-14.

Ala-Luukko, Paper titled: "Mobility Management in IETF and GPRS Specifications" May 15, 2000, pp. 1-15.

Johnson, et al., Paper titled: "Mobility Support in Ipv6", Internet Engineering Task Force, Mobile IP Working Group, Nov. 17, 2000, pp. 1-108.

Shim, et al., Paper titled: Fast Handoff Using Neighbor Information, Internet Engineering Task Force, Mobile IP Working Group, Nov. 2000, pp. 1-14.

Padmanabhan, Technical Report titled: "LandLoc: Landmark-based User Location" Microsoft Research, Jan. 2001, pp. 1-10.

Loughney, et al., aper titled: "ScaMoby Micro Mobility Problem Statement", Internet Engineering Task Force, Feb. 23, 2001, pp. 1-17.

Koodli, et al., Paper tilted: "A Context Transfer Framework for Seamless Mobility", Internet Engineering Task Force, Feb. 21, 2001, pp. 1-19.

Krishnamurthi, et al., Paper titled: "Buffer Management for Smooth Handovers in 1pv6", Internet Engineering Task Force, Mar. 1, 2001, pp. 1-26.

Tsirtsis, et al., Paper titled: "Fast Handovers for Mobile Ipv6", Internet Engineering Task Force, Apr. 2001, pp. 1-33.

Kempf, Paper titled: "Dormant Mode Host Alerting ("IP Paging") Problem Statement", Internet Engineering Task Force, May 2001, pp. 1-13.

Syed, et al., Paper titled: "General Requirements for a Context Transfer Framework", Internet Engineering Task Force, May 2001, pp. 1-10.

Levkowetz, et al.,. Paper titled: "Problem Description: Reasons For Performing Context Transfer Between Nodes in an IP Access Network", Internet Engineering Task Force, May 2001, pp. 1-11.

Malki, et al., Paper titled: "Low Latency Handoff in Mobile Ipv4", Internet Engineering Task Force, May 2001, pp. 1-43.

Perkins: Article titled "Mobile Networking Through Mobile IP", printed from website (http://computer.muni.cz/internet/v2n1/perkins.htm) on Jun. 13, 2001, 17 pages.

Chaskar, Paper titled: "Requirements of a Qos Solution for Mobile IP", Internet Engineering Task Force, Jun. 2001, pp. 1-8.

Fieger, Andreas et al. "Migrating state information in mobile environment," Oct. 1997, pp. 138-143, IEEE.

Wu, Jon Chiung-Shien et at. "Intelligent handoff for mobile wireless internet", Mobile Networks and Applications, Jan. 2001, pp. 67-79, vol. 6, issue 1, Kluwer Academic Publishers, The Netherlands.

O'Neill, Alan et al. "State transfer between access routes during handoff," Internet Engineering Task Force, Aug. 2000, pp. 1-5.

* cited by examiner

PROTOCOL TO DETERMINE OPTIMAL TARGET ACCESS ROUTERS FOR SEAMLESS IP-LEVEL HANDOVER

CROSS REFERENCE TO RELATED CASE

This application is a divisional application of U.S. application Ser. No. 09/892,611, filed Jun. 28, 2001, of the same title.

FIELD OF THE INVENTION

The invention relates generally to telecommunications networks. More particularly, the invention concerns a mechanism for enabling seamless mobility in mobile telecommunications networks.

BACKGROUND OF THE INVENTION

Telecommunication networks for mobile devices include cellular communication systems; mobile Internet Protocol (IP) networks; paging systems; and others. Cellular systems generally allow mobile terminals to move geographically by "handing off" localized communication links among transmission towers and associated base stations. Similarly, mobile IP networks allow IP-enabled devices such as wireless Personal Digital Assistants (PDAs) and mobile computers to move about geographically dispersed areas while maintaining a connection to the Internet.

Mobile devices can provide both voice-based connections and IP connections using different base stations and infrastructures. For example, a Web-enabled cell phone might maintain a voice connection using a first transmission channel and maintain a mobile IP connection using a second (and independent) transmission channel, such that handoffs occur independently for the two channels. Alternatively, voice services can be combined with the IP service, such that a single connection is maintained for both services. Voice connections can also be provided over IP in a combined service.

Figure 1:
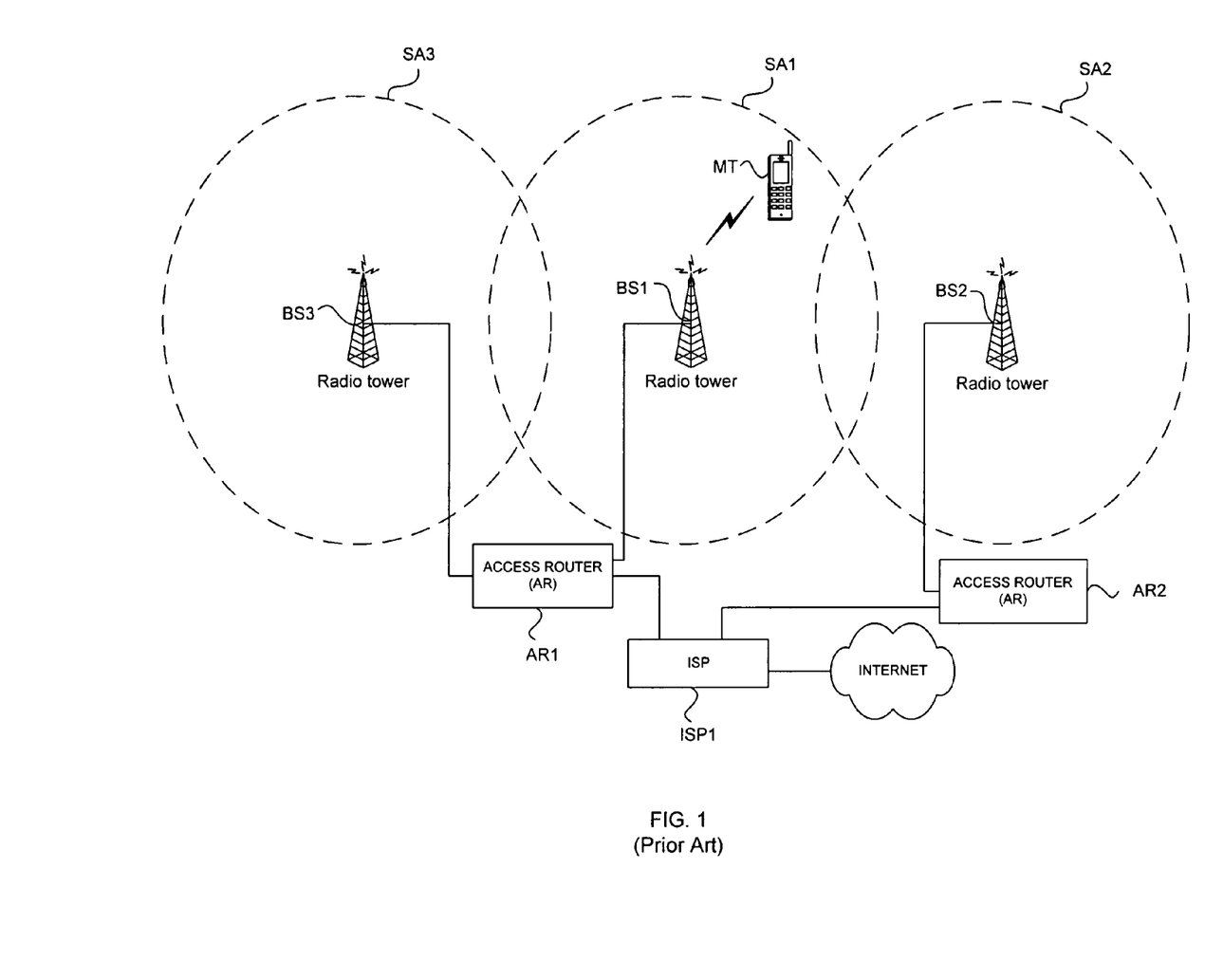
FIG. 1 shows a conventional mobile IP network covering three service areas SA1, SA2, and SA3.

FIG. 1 shows a conventional mobile IP network that covers three service areas SA1, SA2, and SA3. For the sake of simplicity, only IP services are shown, although as explained above, separate transmission networks can be provided for voice services.

As shown in FIG. 1, a mobile terminal MT is within service area SA1 served by base station BS1 (also called an access point or AP). Base station BS1 is connected to an access router AR1, which in turn connects to an Internet service provider ISP1 that provides access to the Internet. Other base stations such as BS3 may also be connected to access router AR1, such that a common IP address is used for mobile terminals even though the terminals may pass through different service areas. In other words, although there may be a hand off of radio frequency channels when the mobile terminal moves between service area SA1 and service area SA3, it may not be necessary to change the IP address used to communicate with the mobile terminal because the Internet connection is still served by the same access router AR1.

A second service area SA2 is served by a separate base station BS2, which is in turn connected to a different access router AR2. Due to the network topology, access routers AR1 and AR2 use different blocks of IP addresses for communicating with mobile terminals roaming within their associated service areas. If mobile terminal MT moves from service area SA1 to service area SA2, some mechanism is needed to hand off the Internet connection from access router AR1 to access router AR2. Similarly, if service areas SA1 and SA2 are separated by a large logical distance (e.g., AR1 and AR2 are connected to different ISPs), some coordination mechanism is needed to permit data transmitted to a terminal previously operating in service area SA1 to be forwarded to service area SA2 if that terminal moves into area SA2.

Figure 2:
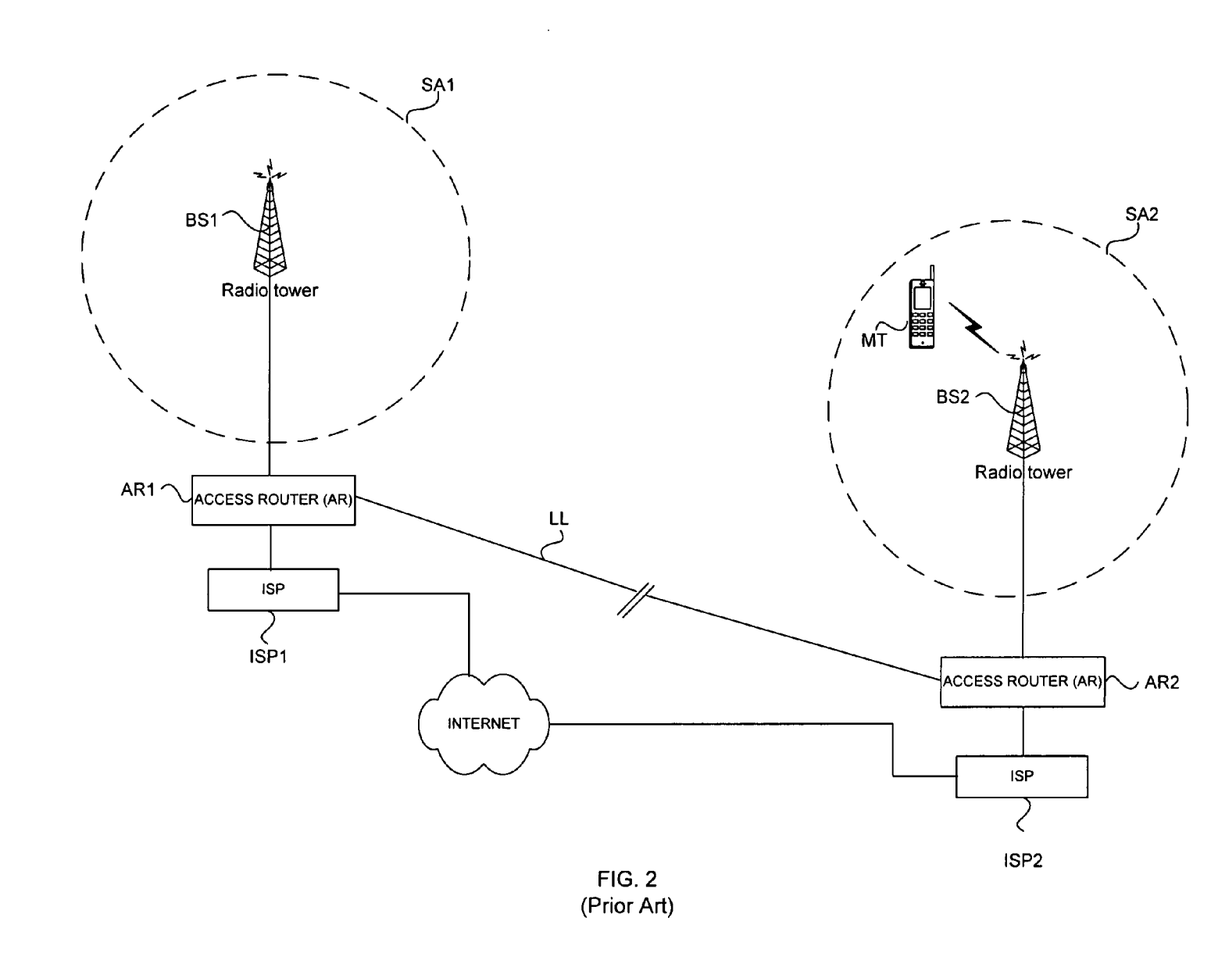
FIG. 2 shows a conventional scheme for handing off IP connections, in which a mobile terminal registers with a home agent AR1 but also communicates using a second IP address through a "care of" agent AR2.

One conventional scheme for handing off IP connections is depicted in FIG. 2.

Service area SA1 is served by access router AR1, which is designated the "home agent" for communicating with a particular mobile terminal MT. While mobile terminal MT moves within service area SA1, access router AR1 communicates with the mobile terminal using an IP address that is assigned to access router AR1. IP packets (e.g., e-mail, Web pages, and the like) are transmitted over the Internet to ISP1, which forwards the traffic to AR1, which in turn knows that a particular IP connection is associated with the mobile terminal in its service area.

If mobile terminal MT moves to a different service area SA2 served by a different access router AR2, packets that were previously transmitted to AR1 will no longer reach the mobile terminal. One conventional solution is to advertise (e.g., broadcast) the existence of access router AR2 in service area SA2, such that when mobile terminal MT moves into service area SA2, it is notified of the existence of access router AR2, and it receives a new IP address for communicating within service area SA2. Mobile terminal MT or access router AR2 then sends a binding update to home agent AR1 (e.g., through a land line LL or over the Internet), so that home agent AR1 knows the IP address that will allow packets to reach the mobile terminal in service area SA2. The home agent treats this address as a "care of" address, and all further packets to the original IP address are forwarded to the new IP address. In essence, two separate IP addresses are used to communicate with the mobile terminal: a home agent address and a care of address that changes at each new point of attachment. This scheme is described in the Internet Engineering Task Force (IETF) Request for Comments (RFC) number 2002 (October 1996).

The above scheme assumes that the target access router (AR2) is known by the originating access router (AR1) prior to the handoff (e.g., mobile terminal MT has accepted the advertisement from AR2 and is assigned an IP address for communicating with it). If there are multiple access routers in the target area each with overlapping service areas, there is no easy way for the mobile terminal to select from among them. For example, suppose that a mobile terminal is receiving high bandwidth video data while moving out of a service area. Two other overlapping service areas served by two access routers controlled by two different service providers may be available to accept the handoff of the mobile terminal's IP connection. One of the two access routers may provide high-speed access to the Internet, while the second one may not. There is no way for the mobile terminal to specify or select from among the two access routers.

Another problem concerns handoff speed. The conventional scenario shown in FIG. 2 may not be able to provide fast handoff speed because of the handshaking required between the mobile terminal and the new access router AR2. Packets may be lost if handoff of the IP connection is not performed smoothly. Moreover, if an IP connection is used for voice-quality signals or music, latency introduced by the handoff may unacceptably disrupt the connection.

Another difficulty with handing off IP connections in mobile networks arises where heterogeneous networks (using different access technologies) served by potentially different (and incompatible) service providers are concerned. Referring again to FIG. 1, if service area SA1 is served by MCI while service area SA2 is served by AT&T, then the two service providers must agree on a coordination mechanism to accept handoffs of IP services from each other's system. Moreover, as new access routers are added to each service provider's system, the details of each new access router must be communicated throughout the system (e.g., from a central authority) to ensure that all access routers in both systems are aware of the others. This approach can result in a single point of failure, and requires coordination of effort among different service providers.

The problem of providing seamless handovers in IP environments is related to ongoing efforts in the Internet Engineering Task Force (IETF), namely in the Context Transfer, Handoff Candidate Discovery, and Seamless Mobility (Sea-Moby) and Mobile IP working groups. Context transfer and fast handover protocols have been developed to exchange session-related information or proactively establish mobile IP connectivity, respectively. Both protocols assume that the target access router is known when requesting the desired functionality (see FIG. 1). Although the discovery of the handoff candidate is included in the SeaMoby working group charter, discovery protocols for physically adjacent access routers have not been studied so far. However, research regarding obtaining physical locations of networking elements has been conducted. Location tracking technologies, such as the Global Positioning System (GPS), provide physical location information of devices attached to the positioning system. Other systems use such information to accurately locate devices. However, since the location is not in relation to any coverage area of an access technology, the location information is not applicable for candidate selection purposes.

Location systems based on radio frequency technologies use the signal of the wireless access technology to determine the position of the mobile node. In contrast to GPS systems, the obtained location is related to the coverage area of the base station being used for location determination. However, the obtained location is specific for the mobile node and does not give any indication of overlapping coverage areas of access routers. Thus, these systems cannot be used to determine physically adjacent networking elements. Moreover, the location determination is usually very specific for the access technology used, and is therefore not suited for multiple access technology scenarios. Besides the lack of accuracy of the obtained location, there is no indication of overlapping coverage areas needed for physical adjacency determination.

What is needed is a system and method for addressing some or all of the aforementioned problems.

SUMMARY OF THE INVENTION

The invention provides a system and method to facilitate seamless handoffs in mobile networks, such as mobile IP networks. A first aspect of the invention enables an access router to dynamically learn about other access routers that are geographically adjacent by receiving information from mobile terminals that move into the service area of the access router. A second aspect of the invention allows access routers to share capability information without requiring a centralized scheme (e.g., using a peer-to-peer approach). A third aspect of the invention allows a target access router to be selected and a handoff arranged on the basis of capability information associated with one or more target access routers and on the basis of the direction of movement of the mobile node. Other features and advantages of the invention will become apparent through the following detailed description, the figures, and the claims.

DETAILED DESCRIPTION OF THE INVENTION

Figure 3:
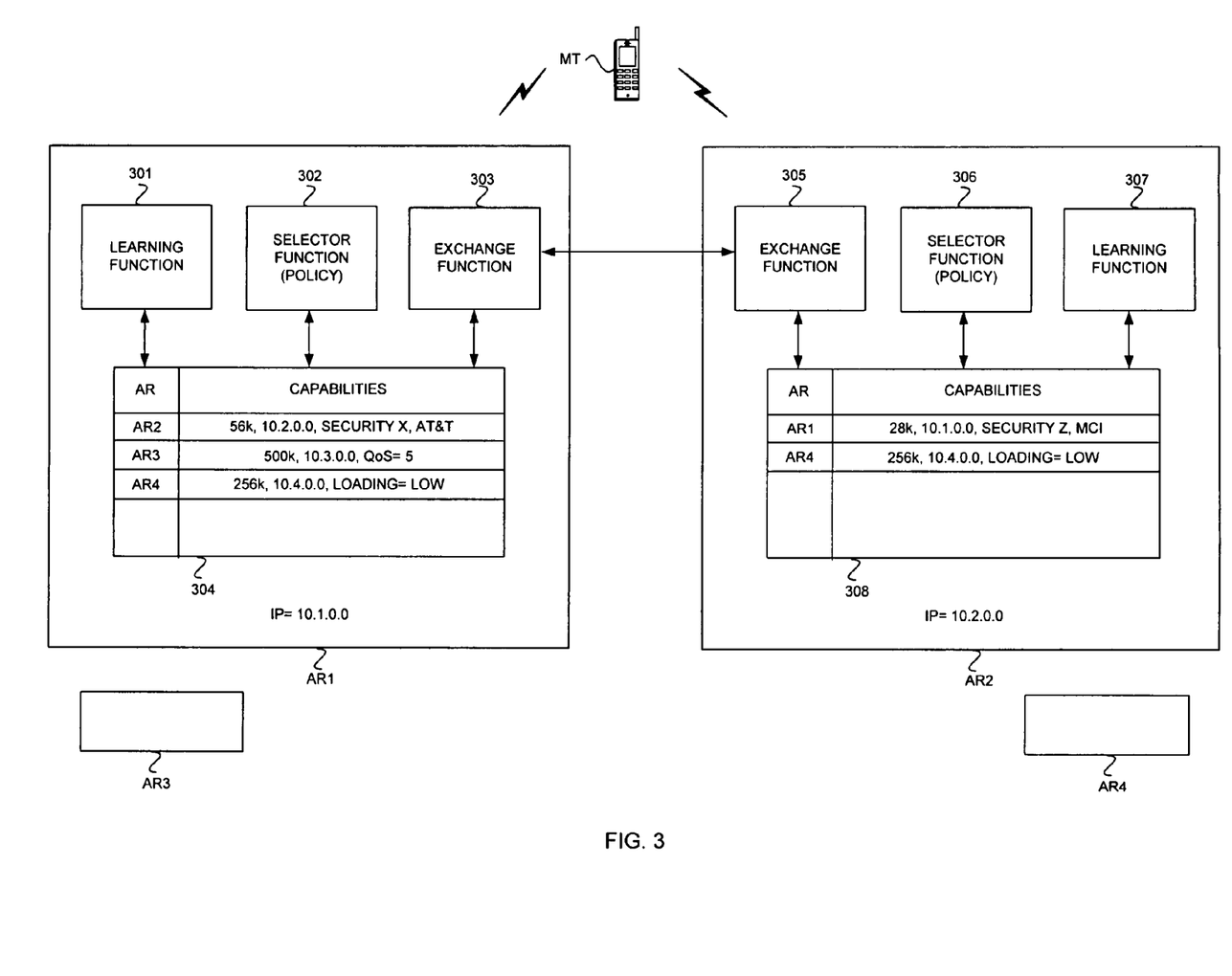
FIG. 3 shows a system according to the invention including a plurality of access routers AR1 and AR2, each of which includes a capability map (304 and 308) describing capabilities of geographically proximate access routers.

FIG. 3 shows a system employing various principles of the invention. As shown in FIG. 3, a first access router AR1 serves a first service area (not shown) in which a mobile terminal MT may be located. Although not explicitly shown in FIG. 3, it is assumed that each access router transmits and receives data packets through one or more base stations that cover corresponding geographic areas. It is also assumed that each access router provides Internet-compatible connections (e.g., IP protocol compatibility) such that data packets received at each router can be forwarded to one or more mobile terminals within the corresponding service area. Each access router includes an IP address used for communicating directly with the access router and a block of IP addresses that can be allocated and used by the access router for communicating with mobile terminals served by the access router. For purposes of illustration, AR1 is shown as having an IP address of 10.1.0.0, and AR2 is shown as having an IP address of 10.2.0.0.

According to one aspect of the invention, each access router creates and maintains a local capability map (elements 304 and 308 in FIG. 3) that stores information concerning other access routers that are geographically adjacent. According to one aspect of the invention, as a mobile terminal MT moves into the area serviced by an access router, the mobile terminal transmits the IP address of the access router for the service area from which the mobile terminal is leaving. In other words, each mobile terminal passes to the next access router information concerning the previously used access router (the previous router's identity, i.e., its IP address). An inference can be drawn that, by virtue of moving out of one router's service area and into another router's service area, the two routers are geographically adjacent. Once each access router knows about the other one, they can exchange capability information that can be used to select a target access router for future handoffs. The capability information, along with the physical neighborhood AR map, can also be constructed through manual configuration.

As shown in FIG. 3, access router AR1 includes a learning function 301, a selector function 302, and an exchange function 303. Similarly, access router AR2 contains such functions (elements 305, 306, and 307) in addition to the capabilities map 308.

Other access routers AR3 and AR4 are shown without internal details. In general, each learning function 301 and 307 receives information from mobile terminals that move into the service area associated with an access router (e.g., the IP address of the previously used access router).

Exchange functions 303 and 305 exchange capability information between two access routers in response to the learning function. For example, when mobile terminal MT is about to move out of the service area supported by AR1 and into the service area of AR2, the mobile terminal transmits to AR2 the IP address (in this case, 10.1.0.0) of the originating access router AR1. In response, learning function 307 stores the IP address of AR1 into capability map 308, and causes exchange function 305 to transmit a request (over the Internet, or through other means) to AR1 to exchange capability information. Thereafter, exchange functions 303 and 305 of the respective access routers exchange capability information (described in more detail below) concerning each respective router's capabilities. For example, if AR1 can support link bandwidths of 28 KBPS and AR2 can support link bandwidths of 56 KBPS, this information is stored in each access router's respective capability map. In this manner, each access router learns about capabilities of neighboring routers.

Selector functions 302 and 306 select target access routers for mobile terminals based on capability information stored in capability maps 304 and 308 respectively. For example, if mobile terminal MT is about to move from a service area served by AR1 into a service area served by multiple target access routers (including, for example, AR2 and AR4), selector function 302 in AR1 consults capability map 304 to determine which access router best suits the capabilities needed by mobile terminal MT. A movement detection scheme is used to inform AR1 which ARs are reachable by the mobile terminal upon movement of the mobile terminal. As explained in more detail below, selection of target routers can be done based on policies stored in each router.

Capabilities associated with each access router may include static capabilities (e.g., bandwidths supported by the router; security protocols; service providers; etc.) and dynamic capabilities (e.g., current loading level or network delays). Examples shown in FIG. 3 include bandwidths supported; security schemes; ISP connected to the router; IP address of the router; quality of service parameters; and dynamic loading conditions.

Any or all of the functions depicted in FIG. 3 can be implemented using computer software executing on a general-purpose or special-purpose digital computer. The capabilities information can be stored in a computer memory, relational database, or other data structure. Conventional access routers can be modified to incorporate the functions illustrated in FIG. 3.

Suppose that the user of mobile terminal MT is watching a movie over an IP connection requiring a connection bandwidth of 256 kilobytes per second (KBPS). Suppose further that terminal MT is about to move from an access router that presently supports such a bandwidth to an area served by two access routers, AR2 and AR4. The movement detection scheme allows AR1 to know that AR2 and AR4 can cover MT after it moves out of service area SA1. Selector function 302 in access router AR1 consults capability map 304 and determines that of the two access routers in the area, only AR4 supports such a bandwidth. Thereafter, AR1 arranges a handoff between mobile terminal MT and access router AR4. Arranging a handoff may include procedures of context transfer (see, e.g., R. Koodli and C. Perkins, "A Context Transfer Framework for Seamless Mobility," Work in Progress, Internet Draft, February 2001), or fast handover (see, e.g., G. Tsirtsis et al., "Fast Handovers for Mobile IPv6," Work in Progress, Internet Draft, April 2001).

A handoff can be arranged in various ways, including instructing the MT to contact AR4; sending a message to AR4 to arrange the handoff; or by other means. It will be appreciated that the selection function can be performed in another router, processor, or mobile terminal.

Suppose that the user of mobile terminal MT requires a high-security connection that supports 128-bit encryption. When terminal MT moves from one service area to another, it informs the old access router of the list of reachable access routers. The old access router selects a target router based on the MT's requirements and the stored capability information of the appropriate neighbor routers. The selection process is explained in more detail below. Other selection schemes can of course be used.

Figure 4:
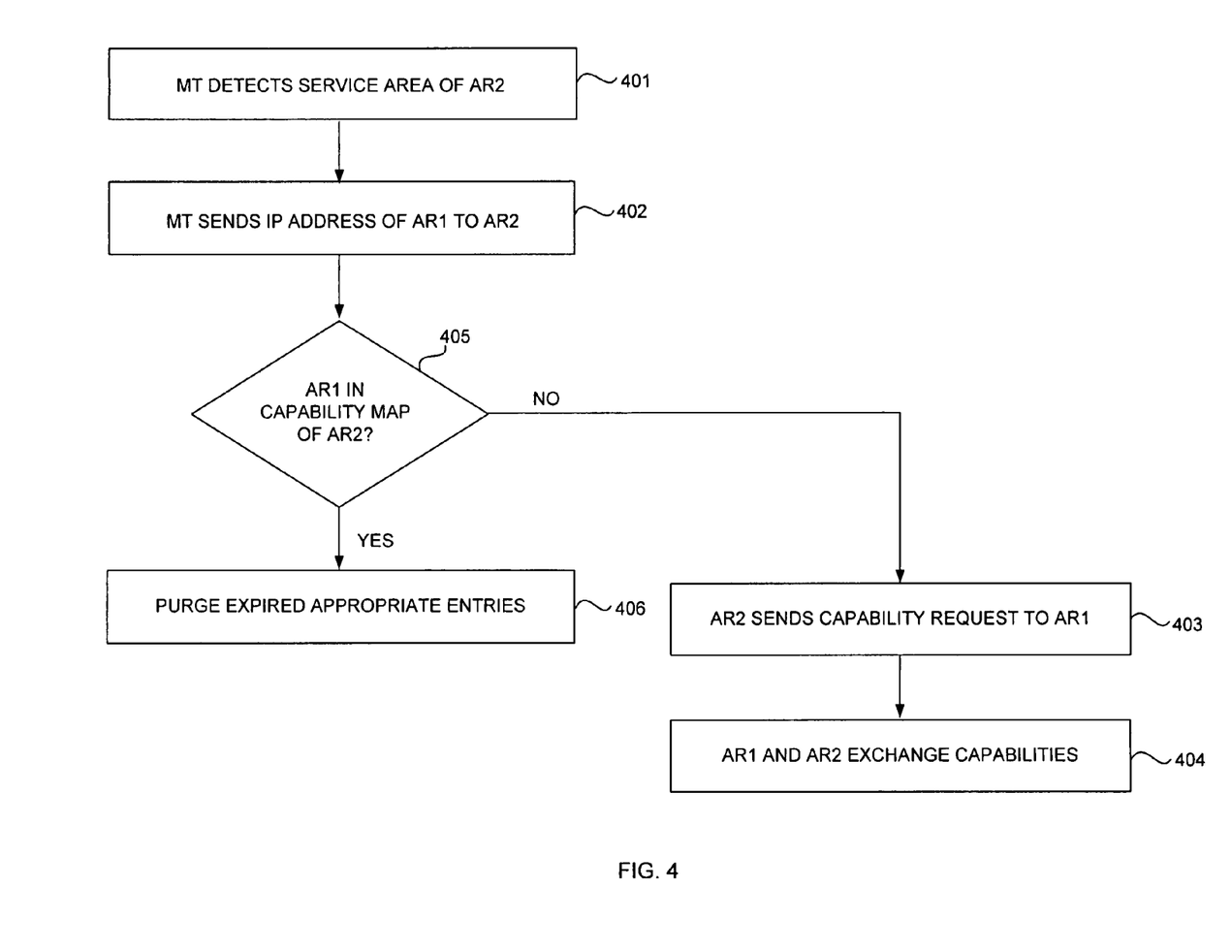
FIG. 4 shows steps in a method to learn about a physical neighborhood and for acquiring capability information from physically adjacent access routers.

FIG. 4 shows steps of a method that can be used to learn a physical neighborhood and to share capability information among different access routers on the basis of mobile terminals moving into a service area associated with an access router. In step 401, mobile terminal MT detects service areas of AR2. In step 402, the mobile terminal sends the IP address of AR1 to AR2. In one embodiment, the IP address is not sent when the MT is switched on; instead, it is only sent during movement of the mobile terminal.

In step 405, a check is made to determine whether AR1 is in the capability map of AR2. Assuming that it is not, then in step 403, AR2 sends a request to AR1 (over the Internet, for example) requesting a list of capabilities of AR1. In step 404, AR1 and AR2 exchange capabilities (including the IP address of AR2) such that both access routers know about the capabilities of the other.

In one embodiment, entries in each router's capability map can be purged if too much time has elapsed since the last handoff occurred between them (e.g., step 406 in FIG. 4). Such purging would be done on the theory that many mobile terminals moving from one service area to another would cause a certain number of handoffs over the time period, and that absence of any handoff from a particular router after such a time might indicate that the router has been removed or disabled or its coverage area has changed, thereby altering the neighborhood map.

Alternatively, entries can be changed upon receiving an unsolicited message from other routers indicating changes in capabilities. Such might be the case, for example, for dynamic capabilities such as current load conditions. Routers can periodically transmit requests to all access routers in a capability map seeking an exchange of updated capability information.

Initial capability maps can be established manually and then updated dynamically over time as outlined above.

Figure 5:
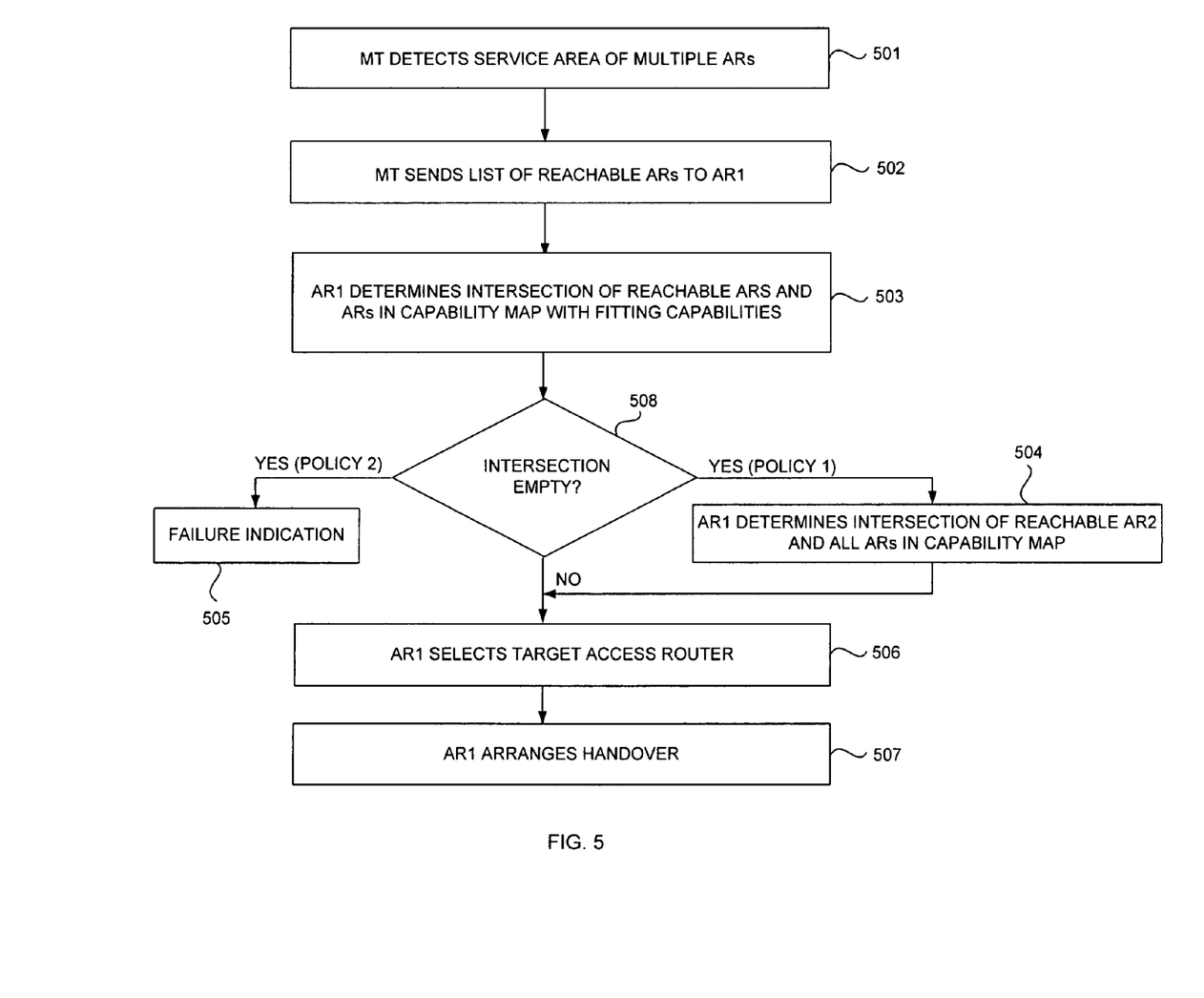
FIG. 5 shows steps in a method for selecting a target access router on the basis of previously stored capability information.

FIG. 5 shows steps of a method that can be used to select a target access router to enable handoff to the selected target access router. In step 501, the mobile terminal detects the service areas of several ARs upon movement into their coverage areas. In step 502, the list of these ARs is sent to the currently serving access router, e.g., AR1. In step 503, AR1 determines the intersection of reachable ARs and those ARs in the capability map that fit MT's and generic AR requirements. If the intersection is empty, two different policies can be applied. In the first one (step 504), AR1 determines instead the intersection of reachable ARs and all neighbors contained in the capability map. When applying the second policy (step 505), a failure indication is delivered to mobile terminal MT, indicating that a handoff based on the delivered requirements is not feasible. The current AR in collaboration with the mobile terminal can then decide whether the mobile terminal can be handed over to an AR among the neighboring ARs that the mobile terminal can hear that best partially suits the mobile terminal's requirements. This may also be a policy decision for the current AR, if it initiates the handover procedure. In step 506, AR1 selects a target access router from the intersection set. In step 507, AR1 initiates a handoff to the selected target access router.

It should be appreciated that each mobile terminal MT could directly transmit capabilities of one access router to another access router in order to perform sharing of capability information, rather than requiring each access router to transmit messages to another access router. Moreover, instead of capability matching occurring in the access routers, each mobile terminal could decide for itself which target access router is optimal, based on capability information transmitted from one of the potential target access routers (e.g., the capability map could be transmitted to the mobile terminal, which would then make the selection). Alternatively, target router selection can be made in the originating access router based on its capability maps.

Although described above in the context of transitioning between service areas, the inventive principles can also be applied to balance loads among access routers even in the absence of service area transitions. For example, when one mobile terminal moves into a service area served by an overloaded access router, the overloaded access router may learn about the existence of the router presently serving the mobile terminal, and can direct some of the mobile terminals presently connected through the overloaded access router to switch to the newly discovered access router.

The capabilities that can be exchanged among routers are wide-ranging and can include static and dynamic capabilities. Examples include bandwidths supported by the router; dynamic loading conditions; security schemes; quality-of-service (QoS) capabilities; file formats (e.g., MP3, JPEG, and others); geographic location of the router; streaming media support; transmission technology (e.g., CDMA, TDMA, GSM); power levels; estimated signal range; proximity to other access routers; ISP connected to the router; current weather conditions; audio and/or video conferencing facilities; cost (e.g., price per minute or per units of data); promotional information (e.g., free access if certain routers are used); advertising; and the like. A mobile terminal that supports more than one transmission technology (e.g., IEEE 802.11 and GSM), for example, can specify a capability requirement that an access router must be associated with a base station that supports either transmission technology before a handoff will be accepted. Moreover, routers can exchange information concerning access points with which each access router is associated. This information can be used to facilitate access router selection, as described in more detail below.

Although in one embodiment capabilities are exchanged only when a mobile terminal moves into a different service area, in other embodiments of the invention each access router periodically queries the other access routers stored in its capability map (e.g., once per hour or once per day) even in the absence of service area transitions. Moreover, it will be appreciated that network addresses (or other identifying information for access routers) of potential target access routers can be transmitted through a mobile terminal back to an originating (current) access router, rather than vice versa, in order to permit sharing of neighborhood information.

According to one variation of the invention, access routers can recursively share information based on information received from one mobile terminal. For example, suppose that a mobile terminal moves into a new service area and forwards the IP address of the previous access router to the new access router. If the capability map includes geographic information (e.g., current location of the router) or signal strength information (e.g., current signal strength associated with the same mobile terminal), the new router could infer that other access routers were similarly close enough to store in its own capability map.

The principles can be applied to access routers that are themselves mobile. For example, suppose that a large sporting event is held at a stadium in a large city. Multiple service providers with truck-mounted access routers and/or transmission equipment can park next to the stadium and provide service to mobile terminals for users attending the sporting event. Each user's mobile terminal can select a different one of the service providers (and access routers) on the basis of each truck's location and capabilities. One of the trucks may have the capability to provide free access at limited bandwidths to mobile terminals willing to accept advertisements on the their mobile terminals. Another of the trucks may provide higher bandwidth access (e.g., video rates) but at a cost of 10 cents per minute. Routers associated with each truck can share capabilities with the other on the basis of a mobile terminal that transitions between access routers associated with each truck. It will be appreciated that transmission equipment could be provided on one truck while access routers are provided in another truck or a trailer. As explained above with respect to one embodiment, once handovers stop happening from a particular AR in an AR's physical neighbor map, it will be removed. This is because each entry in the physical neighbor map has a lifetime associated with it. When a handover occurs to or from a neighboring AR, this lifetime is updated.

Figure 6:
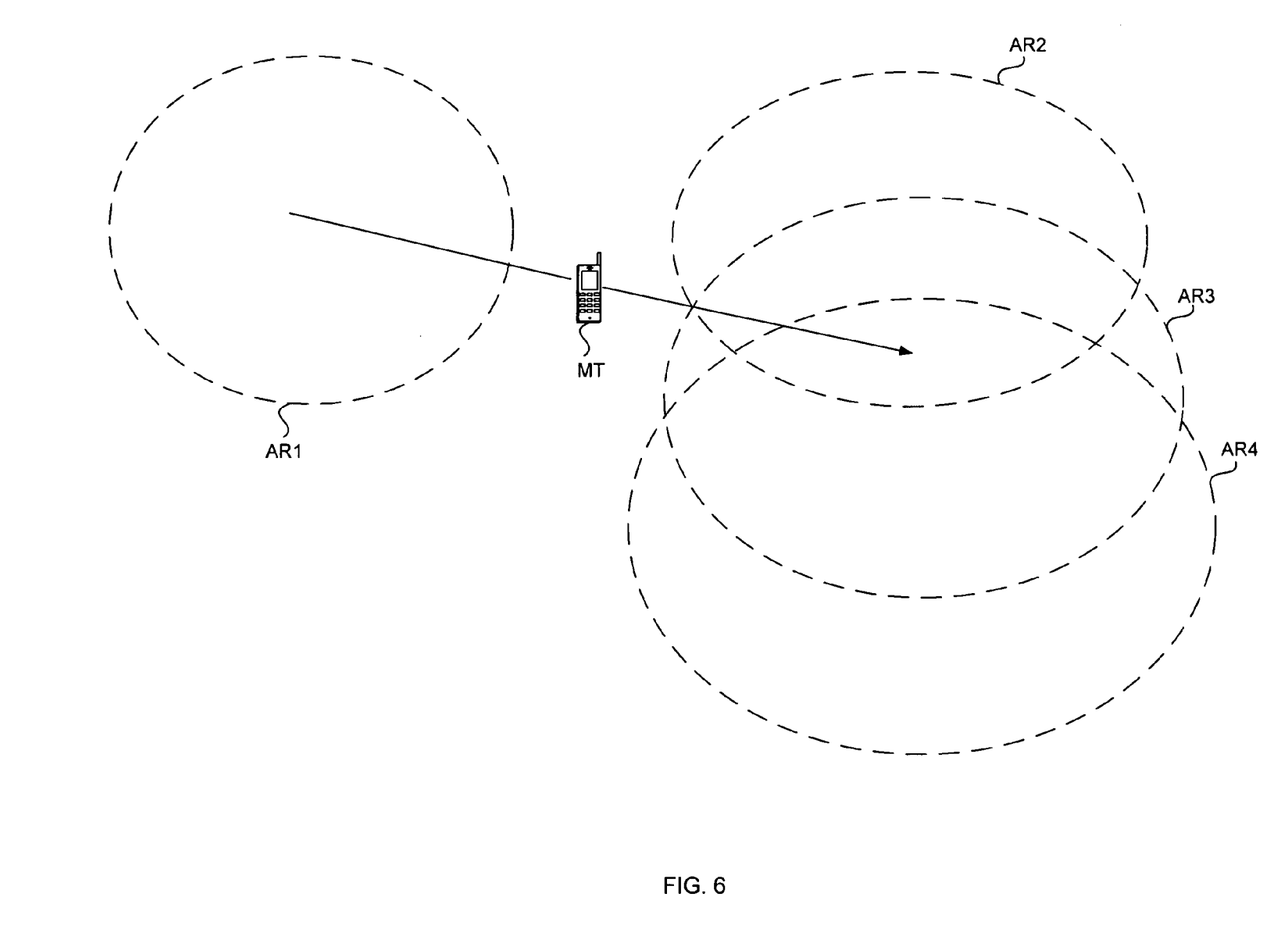
FIG. 6 shows a mobile terminal MT moving from a service area associated with a first access router AR1 to an area serviced by three different access routers AR2, AR3, and AR4.

FIG. 6 shows a mobile terminal MT moving from a service area associated with a first access router AR1 to an area serviced by three different access routers AR2, AR3, and AR4. A mobile terminal user arriving at a stadium might transition from a service area associated with access router AR1 to potentially overlapping service areas supported by different trucks parked at the stadium (e.g., access routers AR2, AR3, and AR4). As mobile users move from the service area associated with AR1 into the stadium and encounter multiple access routers at the stadium, access router AR1 would learn about the capabilities of the access routers at the stadium, and would then be able to selectively control the handoff of other mobile terminals on the basis of capability information associated with each access router at the stadium and (optionally) each mobile terminal's capability requirements. Under this scenario, two different mobile terminals moving into the same geographic location could be assigned to different access routers, depending on the capabilities required by each mobile terminal.

As another example, suppose that the user of a mobile terminal is traveling toward a shopping mall equipped with free Internet access. As the user draws near, he or she may be invited to switch to the free access router in exchange for enduring advertising. (The user could establish a profile in advance indicating a preference for free access routers where they are available). But a different user who makes the same movements might instead be automatically handed off to a high-quality cost-based access router because of an application program presently operating in the mobile terminal (e.g., a video phone call). Users could also establish conditional capability requirements; for example, default to free access routers unless a video call is in progress, in which case a cost-based router that can guarantee bandwidth would be selected.

There are various methods of detecting movement of a mobile terminal to a new service area. In one approach, the mobile terminal "helps" the access router by listening to beacons of neighboring base stations associated with different access routers. This decision made by the mobile terminal to start listening to these neighborhood beacons can be made by the mobile terminal or be initiated by the AR at a time when a handover is deemed necessary. For example, the current AR's signal to the mobile terminal might be fading, or the mobile terminal's signal to the current AR might be fading, or both. One of the two entities (mobile terminal or AR) or both might decide that a handover is necessary. (In order to conserve power, the mobile terminal need not constantly listen to neighboring beacons when not necessary to do so). When the mobile terminal determines that the signal strength associated with the current access router falls below a threshold level and that the signal strength associated with a different access router is higher, the mobile terminal can initiate a handoff request using the principles outlined above.

When a mobile terminal hears signals from neighboring base stations or access points, it forwards this information back to its current serving AR. This information could be low-level link layer information from these base stations, or it could be the IP addresses of the ARs they are attached to, or both. This information is forwarded in its entirety to the AR to which the mobile terminal is currently attached. These base stations can rely on different transmission technologies. If the IP addresses of the potential target ARs are made available to the current router as described above, then a potential target AR list is immediately available to the current router. These form the list of ARs that the mobile terminal could be handed over to because these are the ARs that the mobile terminal can hear. The target router is chosen from this list based on their capabilities or, if there is more than one possible router for handover, it can be done based on some policy.

In the event that the mobile terminal does not forward IP addresses of the potential target access routers that it hears and only forwards link level (e.g., base station identifiers) information, then the current AR identifies the ARs among the neighbors to which the base stations are attached. It therefore multicasts the base station IDs it hears to all the routers in its neighborhood list. The ARs to which these base stations belong reply back with an acknowledgement. The potential target access router list is thus formed in this scenario and a process similar to the one explained in the previous paragraph is used to identify the target access router. This multi-cast message can be avoided if the link-level IDs of base stations can be exchanged at the time of capability exchange. In the latter approach, the original access router would consult its capability map to determine which access router(s) are associated with the beacon(s).

In the event that a mobile terminal is unable to assist the current router in identifying the best target AR in its neighborhood, and the current AR or the mobile terminal determines that a handover is necessary, the current AR can use the following procedure to identify the target AR. The current AR multi-casts a polling message with the mobile terminal's ID to all of its neighbors. The neighboring ARs poll their base stations to determine whether they can hear the mobile terminal's signal. These base stations send out a beacon to which the mobile terminal must respond. In another approach, the base stations could listen in to the mobile terminal's control signals. The base stations that can hear the signal forward this information to their respective ARs, which then respond to the AR that sent out the polling message. Once ARs respond to the polling message, the current AR has a list of potential target ARs. It then uses the capability information or some policy decision to identify the target AR for the mobile terminal.

In one embodiment, a security feature is included to prevent so-called "denial of service" attacks or corrupted capability information. In this embodiment, the second (target) access router queries the first (originating) access router to validate that the mobile terminal was recently served by the first access router. Such a query can be performed by transmitting an IP packet from the second access router to the first access router, and receiving a validation response from the first access router. If the validation was not successful, the capability exchange operation would be inhibited and the first access router would not be added to the second access router's neighborhood map. (This would also prevent the situation where a mobile terminal leaves an East Coast service area, is turned off, and then is turned on again in a West Coast service area). This would prevent a malicious mobile terminal from pretending to be handed off from the first access router when in fact it was previously served by a third access router. This feature could alternatively be implemented by voluntarily transmitting the packet from the first access router to the second access router providing validation information.

Figure 7:
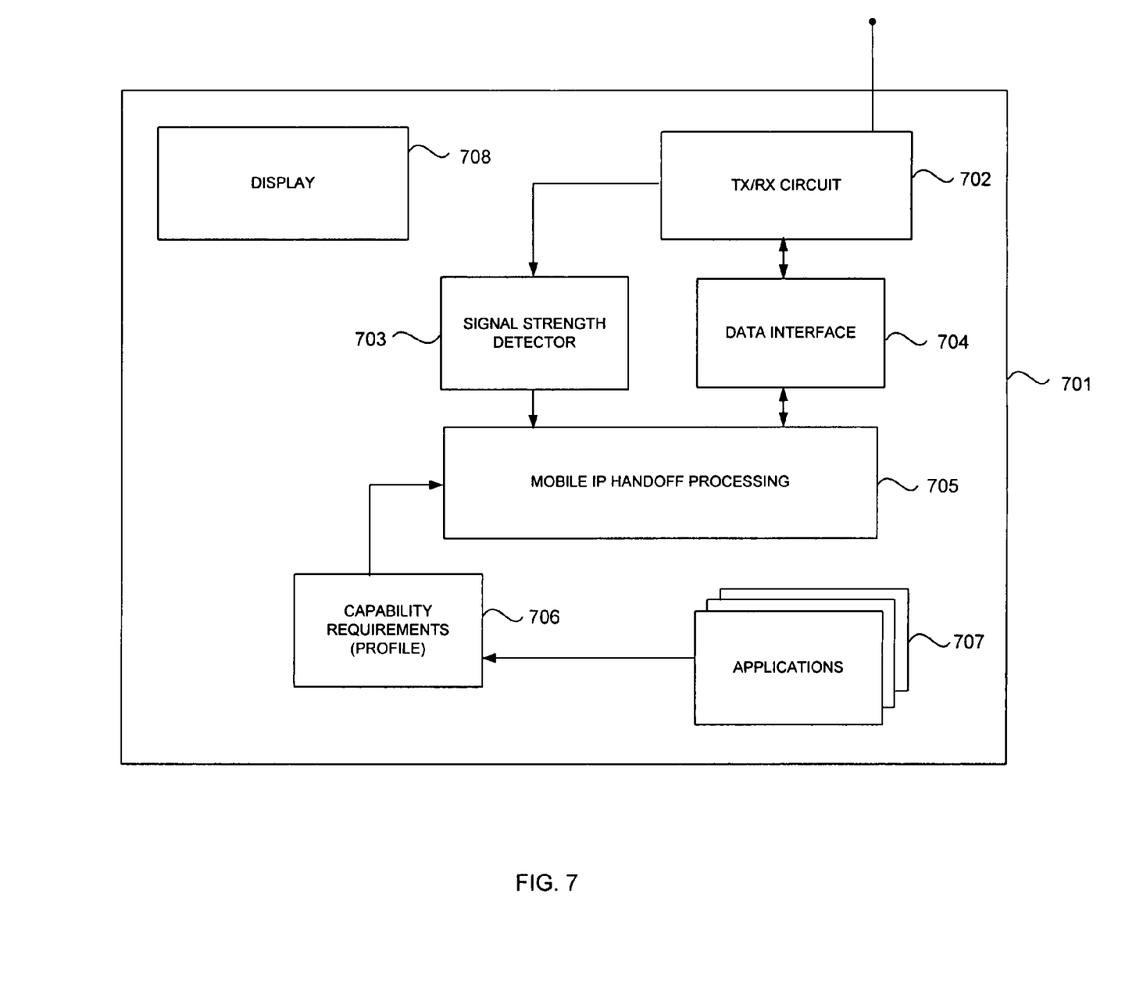
FIG. 7 shows a mobile terminal 701 equipped with processing functions and memory to carry out various aspects of the invention.

FIG. 7 shows one possible implementation of a mobile terminal that can be used to carry out the inventive principles. The mobile terminal 701 includes a transmit/receive circuit 702 that communicates with one or more base stations. The base stations may be the same base stations used by conventional voice-based cellular phone networks (e.g., using CDMA or TDMA technology), or they may be separate and apart from such phone networks. Nevertheless, circuit 702 transmits digital data comprising IP packets that are to be routed through the mobile IP network. The receiving part of the circuit receives signal strength or beacon information from base stations, which is processed by a signal strength detector 703. Data interface circuit 704 converts digital messages into a format suitable for transmission through transmit/receive circuit 702 and vice versa. Depending on the circuit implementation, data interface 704 may not be necessary.

Mobile IP handoff processing circuit 705 makes decisions on the basis of the signal strength and previously stored capabilities requirements or profile 706. The capabilities requirements can be manually entered by a user (e.g., using a graphical user interface or keypad), or they can be automatically set depending on which of various application programs 707 are executing on the mobile terminal. For example, if the user is executing a movie application that requires a certain bandwidth, the application could automatically set a capability requirement corresponding to that bandwidth. Thereafter, mobile terminal 701 would transmit this requirement when attempting a handoff to a new access router.

Some or all of the functions shown in FIG. 7 can be implemented using application-specific integrated circuits; microprocessors programmed with software; signal processing devices; specialized circuits; or combinations of the above. Consequently, the arrangement of functions shown in FIG. 7 is not intended to imply a specific arrangement of hardware circuits.

As explained previously, the IP handoff mechanisms described herein can co-exist with other handoff mechanisms in a single mobile terminal. For example, although FIG. 7 shows a mobile IP handoff processing function, a completely separate handoff function can co-exist in the mobile terminal for the purpose of separately handing off voice connections based on entirely different criteria. Alternatively, voice connections can be implemented over an IP connection, and voice handoff considerations can thus be incorporated into the decisionmaking process. For example, packet latency might be a much bigger concern when making decisions regarding target access routers, due to the ability of humans to perceive echoes and delays in packetized speech where packets are delayed.

The term "mobile terminal" should be understood to include IP-enabled cellular telephones; wirelessly accessible Personal Digital Assistants (PDAs) such as those manufactured by PALM Inc.; notebook computers that can communicate wirelessly; and other mobile devices that can communicate using packetized digital communications over various transmission technologies (including CDMA, GSM, TDMA, and others) or media (radio, infrared, laser, and the like).

The term "access router" should be understood to include computer-implemented devices that route packets, such as IP packets, to addresses in a network based on routing information. However, it should be understood that access routers are distinct from base stations/access points, which may rely on different transmission schemes to transmit information (e.g., GSM or CDMA). One or more base stations could be associated with a single access router, as shown in FIG. 1. Alternatively, more than one access router could be associated with a single base station.

The term "mobile IP network" should be understood to include a network or networks (even if incompatible in transmission technology or operated by different carriers) that communicate wirelessly with mobile terminals using Internet Protocol.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer.

We claim:

1. An apparatus comprising:
   a processor that executes computer-readable instructions, and a memory storing the computer-readable instructions that, when executed, causes the apparatus to
   receive from a first mobile terminal an IP address of an access router for the service area from which the first mobile terminal is leaving;
   use the IP address of the access router to discover capabilities of the access router;
   store capabilities of the access router in a capabilities map that maps each of a plurality of access routers that are geographically adjacent to capabilities of each access router in a mobile IP network; and
   in response to a request to perform a handoff of an IP service involving a second mobile terminal, select an optimum access router for the handoff on the basis of the stored capabilities map.

2. The apparatus of claim 1, wherein the memory comprises computer-executable instructions that, when executed, causes the apparatus to compare capabilities requirements received from the second mobile terminal with the capabilities map.

3. The apparatus of claim 2, wherein the memory comprises computer-executable instructions that, when executed, causes the apparatus to find an optimum access router by comparing the stored capabilities map with a policy.

4. The apparatus of claim 1, wherein the memory comprises computer-executable instructions that, when executed, causes the apparatus to find an optimum access router by comparing the stored capabilities map with a policy.

5. The apparatus of claim 1, wherein the computer-readable instructions, when executed, causes the apparatus to initiate an exchange of access router capabilities between at least two geographically adjacent access routers.

6. A method comprising:
   at a first access router for the service area of which a first mobile terminal is entering, receiving from the first mobile terminal an IP address of a second access router for the service area from which the first mobile terminal is leaving;
   at the first access router, using the IP address of the second access router to discover capabilities of the second access router;
   storing capabilities of the second access router in a capabilities map in the first access router that maps each of a plurality of access routers that are geographically adjacent to capabilities of each access router in a mobile IP network; and
   at the first access router, in response to a request to perform a handoff of an IP service involving a second mobile terminal, selecting by the first access router an optimum access router for the handoff on the basis of the stored capabilities map.

7. The method of claim 6, further comprising comparing by the first access router capabilities requirements received from the second mobile terminal with the capabilities map.

8. The method of claim 7, further comprising finding by the first access router an optimum access router by comparing the stored capabilities map with a policy.

9. The method of claim 6, further comprising finding by the first access router an optimum access router by comparing the stored capabilities map with a policy.

10. The method of claim 6, further comprising at the first access router, transmitting the capabilities of the first access router to the second access router.

11. A computer-readable medium encoded with computer-readable instructions that when executed by a data processing device, performs a method comprising:
    receiving from a first mobile terminal an IP address of an access router for the service area from which the first mobile terminal is leaving;
    using the IP address of the access router to discover capabilities of the access router;
    storing capabilities of the access router in a capabilities map that maps each of a plurality of access routers that are geographically adjacent to capabilities of each access router in a mobile IP network; and
    in response to a request to perform a handoff of an IP service involving a second mobile terminal, selecting an optimum access router for the handoff on the basis of the stored capabilities map.

12. The computer-readable medium of claim 11, wherein the computer-readable instructions, when executed, compares capabilities requirements received from the second mobile terminal with the capabilities map.

13. The computer-readable medium of claim 12, wherein the computer-readable instructions, when executed, finds an optimum access router by comparing the stored capabilities map with a policy.

14. The computer-readable medium of claim 11, wherein the computer-readable instructions, when executed, finds an optimum access router by comparing the stored capabilities map with a policy.

15. The computer-readable medium of claim 11, wherein the computer-readable medium is encoded with computer-readable instructions that when executed by the data processing device, performs a method comprising initiating an exchange of access router capabilities between at least two geographically adjacent access routers.

* * * * *